United States Patent
Duffett-Smith et al.

(10) Patent No.: US 8,255,160 B2
(45) Date of Patent: Aug. 28, 2012

(54) INTEGRATED MOBILE TERMINAL NAVIGATION

(75) Inventors: Peter James Duffett-Smith, Cambridge (GB); Anthony Richard Pratt, Northampton (GB)

(73) Assignee: Cambridge Positioning Systems Limited, Cambridge (GB)

( * ) Notice: Subject to any disclaimer, the term of this patent is extended or adjusted under 35 U.S.C. 154(b) by 674 days.

(21) Appl. No.: 12/311,026

(22) PCT Filed: Sep. 7, 2007

(86) PCT No.: PCT/EP2007/059429
§ 371 (c)(1),
(2), (4) Date: Jun. 24, 2009

(87) PCT Pub. No.: WO2008/034728
PCT Pub. Date: Mar. 27, 2008

(65) Prior Publication Data
US 2009/0281729 A1    Nov. 12, 2009

(30) Foreign Application Priority Data
Sep. 18, 2006 (EP) .................................... 06120820

(51) Int. Cl.
*G01S 5/14* (2006.01)
(52) U.S. Cl. ........ 701/470; 701/478; 701/489; 701/491; 342/357.29; 342/357.49
(58) Field of Classification Search ........................ None
See application file for complete search history.

(56) References Cited

U.S. PATENT DOCUMENTS
5,774,829 A  6/1998  Cisneros et al.
6,249,245 B1 6/2001  Watters et al.
(Continued)

FOREIGN PATENT DOCUMENTS
EP    1271178    3/2005
(Continued)

OTHER PUBLICATIONS
Van Graas, F., "Sole Means Navigation Through Hybrid Loran-C and GPS", Navigation: Journal of the Institute of Navigation, vol. 35, No. 2, 1998, pp. 147-160.
(Continued)

*Primary Examiner* — Michael J. Zanelli
(74) *Attorney, Agent, or Firm* — Roylance, Abrams, Berdo & Goodman, LLP

(57) ABSTRACT

A navigation system is described which includes a mobile terminal 100 which has a transmission source receiver 204 for receiving the signals from one or more unsynchronised terrestrial transmission sources 102-105 and a satellite positioning receiver 200 for receiving signals from the satellite or satellites 107-110 of a satellite positioning system. The terminal also has a clock 208. A processor 209 is arranged to acquire a measurement vector having a list of values, each value representing a measurement made by a receiver 200, 204, and the terminal clock's bias. It computes a state vector representing the current state of the system, using a previously-determined state vector, the measurement vector, and a dynamic model in order to derive a dynamic navigation solution. The elements of the state vector include (a) in one or more dimensions at least position information of the terminal 100; (b) representations of the bias of the clocks associated with the unsynchronised terrestrial transmission sources 102-105 relative to a given time; (c) the bias of the terminal clock 208; (d) quality indicators indicating the error associated with elements of (a) to (c); and (e) linking indicators indicating the dependency of elements in (a) to (c) on others of those elements.

28 Claims, 6 Drawing Sheets

U.S. PATENT DOCUMENTS

| | | | |
|---|---|---|---|
| 6,252,543 | B1 | 6/2001 | Camp |
| 6,275,705 | B1 | 8/2001 | Drane et al. |
| 6,430,416 | B1 | 8/2002 | Loomis |
| 6,529,165 | B1 | 3/2003 | Duffett-Smith et al. |
| 6,903,683 | B1 * | 6/2005 | Nicholson ................ 342/357.42 |
| 6,928,292 | B2 | 8/2005 | Tsunehara et al. |
| 6,937,866 | B2 | 8/2005 | Duffett-Smith et al. |
| 7,295,156 | B2 * | 11/2007 | Van Wyck Loomis .. 342/357.43 |
| 7,978,136 | B2 | 7/2011 | Duffett-Smith et al. |
| 2002/0173322 | A1 * | 11/2002 | Turetzky et al. .............. 455/502 |
| 2004/0005899 | A1 * | 1/2004 | Nir et al. .................... 455/456.1 |

FOREIGN PATENT DOCUMENTS

| | | |
|---|---|---|
| JP | 2003 501632 | 1/2003 |
| JP | 2003 501633 | 1/2003 |
| JP | 2003 520968 | 7/2003 |
| JP | 2005 517340 | 6/2005 |
| JP | 2006 504110 | 2/2006 |
| WO | WO 00/73813 | 12/2000 |
| WO | WO 01/53848 A2 | 7/2001 |
| WO | WO 2005/071430 | 8/2005 |

OTHER PUBLICATIONS

Peterson, B. et al., "Integrated GPS/LORAN: Structures and Issues", Navigation: Journal of the Institute of Navigation, vol. 45, No. 3, 1998, pp. 183-193.

Duffett-Smith, P. et al., "E-GPS: indoor mobile phone positioning on GSM and W-CDMA", Proceedings of the ION GNSS 2005 Meeting, Sep. 2005, 7 pgs.

Kao, M.et al., "Multi-configuration Kalman filter design for high-performance GPS navigation", IEEE Transactions on Auto control, AC28, Mar. 1983, pp. 304-314.

* cited by examiner

| Measurement name | Symbol |
|---|---|
| Number of code-phase offsets | $N_s$ |
| SV1 code-phase time offset | $s_1$ |
| SV2 code-phase time offset | $s_2$ |
| SV3 code-phase time offset | $s_3$ |
| SV4 code-phase time offset | $s_4$ |
| SV5 code-phase time offset | $s_5$ |
| SV1 quality indicator | $\sigma_{s1}^2$ |
| SV2 quality indicator | $\sigma_{s2}^2$ |
| SV3 quality indicator | $\sigma_{s3}^2$ |
| SV4 quality indicator | $\sigma_{s4}^2$ |
| SV5 quality indicator | $\sigma_{s5}^2$ |
| Number of network OTDs | $N_n$ |
| Network OTD1 | $n_1$ |
| Network OTD2 | $n_2$ |
| Network OTD3 | $n_3$ |
| Network OTD4 | $n_4$ |
| Network OTD5 | $n_5$ |
| Network OTD6 | $n_6$ |
| OTD1 quality indicator | $\sigma_{n1}^2$ |
| OTD2 quality indicator | $\sigma_{n2}^2$ |
| OTD3 quality indicator | $\sigma_{n3}^2$ |
| OTD4 quality indicator | $\sigma_{n4}^2$ |
| OTD5 quality indicator | $\sigma_{n5}^2$ |
| OTD6 quality indicator | $\sigma_{n6}^2$ |
| Local clock time | $t_L$ |

Figure 3

| Variable name | Symbol |
|---|---|
| Mobile terminal longitude | $x$ |
| Mobile terminal latitude | $y$ |
| Mobile terminal height | $z$ |
| Speed in longitude direction | $v_x$ |
| Speed in latitude direction | $v_y$ |
| Speed in height direction | $v_z$ |
| Acceleration in longitude direction | $a_x$ |
| Acceleration in latitude direction | $a_y$ |
| Acceleration in height direction | $a_z$ |
| Transmission time offset (TTO) of BTS A | $\alpha_A$ |
| Transmission time offset of BTS B | $\alpha_B$ |
| ⋮ | ⋮ |
| Transmission time offset of BTS N | $\alpha_N$ |
| Rate of change of TTO A | $\alpha'_A$ |
| Rate of change of TTO B | $\alpha'_B$ |
| ⋮ | ⋮ |
| Rate of change of TTO N | $\alpha'_N$ |
| Local clock bias (or offset) | $T_L$ |
| Rate of change of local clock bias | $T'_L$ |
| Covariance matrix | $C$ |

Figure 4

$$C = \begin{bmatrix} \sigma^2_{xx} & \sigma^2_{xy} & \sigma^2_{xz} & \cdots & \sigma^2_{x\alpha_k} & \cdots & \sigma^2_{xT'_L} \\ \sigma^2_{yx} & \sigma^2_{yy} & \sigma^2_{yz} & \cdots & \sigma^2_{y\alpha_k} & \cdots & \sigma^2_{yT'_L} \\ \sigma^2_{zx} & \sigma^2_{zy} & \sigma^2_{zz} & \cdots & \sigma^2_{z\alpha_k} & \cdots & \sigma^2_{zT'_L} \\ \vdots & \vdots & \vdots & \vdots & \vdots & & \vdots \\ \sigma^2_{\alpha_k x} & \sigma^2_{\alpha_k y} & \sigma^2_{\alpha_k z} & \cdots & \sigma^2_{\alpha_k \alpha_k} & \cdots & \sigma^2_{\alpha_k T'_L} \\ \vdots & \vdots & \vdots & \vdots & \vdots & & \vdots \\ \sigma^2_{T'_L x} & \sigma^2_{T'_L y} & \sigma^2_{T'_L z} & \cdots & \sigma^2_{T'_L \alpha_k} & \cdots & \sigma^2_{T'_L T'_L} \end{bmatrix}$$

Figure 5

| Variable name | Symbol |
|---|---|
| Mobile terminal longitude | $x$ |
| Mobile terminal latitude | $y$ |
| Mobile terminal height | $z$ |
| Speed in longitude direction | $v_x$ |
| Speed in latitude direction | $v_y$ |
| Speed in height direction | $v_z$ |
| Acceleration in longitude direction | $a_x$ |
| Acceleration in latitude direction | $a_y$ |
| Acceleration in height direction | $a_z$ |
| GPS Time | $\tau$ |

Figure 6

INTEGRATED MOBILE TERMINAL NAVIGATION

FIELD OF THE INVENTION

The invention relates to the field of mobile telecommunications systems and, in particular, to means by which a mobile terminal of such a system may be located using both signals of the system and those of satellite positioning systems (SPS).

BACKGROUND TO THE INVENTION

Legal mandates in some countries require every operator of a cellular communications system to provide means for estimating and reporting the position of any mobile terminal operating within its network in the case of an emergency. Positioning methods applied to mobile terminals are also being used for location-based services in which applications provide information based on the estimated position of a terminal. Several positioning methods and systems have been developed in attempts to satisfy the various requirements, including ones which use SPS signals and others which use the signals radiated within the communications network itself, flowing in either direction between the mobile terminal and the network base transceiver stations. Satellite positioning systems include the Global Positioning system (GPS), GLONASS, and Galileo. These all operate in a similar way. Satellites in near-Earth orbit emit ranging signals which can be received and decoded to obtain estimates of the distances between the receiving terminal and each satellite. Four or more such estimates are usually sufficient to provide a three-dimensional position fix together with time measured with respect to the SPS time base.

In the case of GPS, the signals available for civilian use are radiated on 1575.42 MHz (known as L1) and on 1227.60 MHz (known as L2). The L1 carrier signals are bi-phase modulated with a ranging/spreading code, different for each satellite, at a chipping rate of 1.023 MHz. The code is a pre-defined member of the Gold family as specified in a US Government Publication—an Interface Standard IS-GPS 200. The civilian code is called the CA code and it has a length of 1023 chips, repeating every 1 ms.

The code epoch, i.e. its starting point, is defined in IS-GPS 200 and corresponds to the occurrence of a certain state of the CA code generator. The code epoch is aligned with a high-precision (atomic) clock carried on board the satellite. A number of terrestrial control centres, known collectively as the ground-based control segment, continuously monitor and steer the satellite clocks towards alignment with the GPS time-base, known as GPS time. This is held in a clock located at the United States Naval Observatory in Washington D.C. and is a continuous time scale which is itself aligned, typically within a few micro-seconds (apart from leap seconds) with Universal Coordinated Time (UTC). Each satellite clock may have a time error with respect to GPS time of up to 976.6 ms. The difference between GPS time and that held in the satellite clock is broadcast to users by the satellite using three parameters known as the clock correction parameters.

The ground-based control segment also measures and estimates the location and orbit of each satellite. Knowledge of the track actually followed by each satellite, its current position, and estimates of the effects of the gravity fields of the Sun, Moon and Earth, the effects of the Solar wind and some other smaller forces, are used to predict the future orbits of each satellite which is then broadcast to all users. The orbital parameters are known collectively as the satellite ephemeris, and they can usually be used to extrapolate over periods of a few hours. A lower-precision version of the orbit, called the satellite almanac, with a life of several months or more, is also broadcast.

A GPS terminal containing a radio receiver, ancillary hardware, and one or more processors running software programs, is often collectively known as a 'GPS receiver'. Hereinafter, we understand the term 'receiver' in this wider sense to include all the parts necessary to carry out the functions of receiving, decoding signals, and processing data. A GPS receiver, therefore, receives the satellite ranging signals, the satellite clock correction parameters and the satellite ephemeris and almanac messages, for one or a plurality of satellites, and is able to calculate the position and velocity of the receiver and the time offset of its local clock relative to GPS time. This local clock is typically based on an oscillator within the GPS receiver or attached to it, the local clock time being controlled by of the phase of the oscillator. Although at least four satellite ranging signals are needed for a three-dimensional position-plus-time solution, there are also a number of reversionary modes of operation that permit solutions to be obtained with 3 or 2 or, in some circumstances with only 1 satellite signal present. The present constellation of 30 operational GPS satellites is such that as many as 12 satellite signals may sometimes be received simultaneously, providing for reduced solution errors.

Similarly, the word 'receiver' when applied to the terminal's terrestrial transmission source receiver, should be understood in the same widest sense to include the radio receiver front-end, ancillary hardware, and one or more processors running software programs.

Although SPS receivers work very well in open-sky conditions, they are less successful in places where one or more of the satellite signals is subject to attenuation through blockage, for example inside a building. In these circumstances, the SPS receiver may benefit from support, both for signal acquisition and signal re-acquisition, from an alternative location technology which continues to operate. In addition, the location solutions, using SPS signals subject to blockage conditions, are often less accurate because of the radio propagation conditions, including reflections from nearby objects, refraction around edges, additional delays relative to the ideal 'line-of-sight' straight-line path between the receiver and the satellite, and interference between rays travelling on different paths.

Alternative methods for finding the position of a mobile terminal, adapted especially to cellular communications networks, use the communications signals themselves. These include the use of the position of the serving cell tower as a basis for a coarse position, measurements of the angles or times of arrival at base station sites of signals radiated by the terminal, and measurements of the times of arrival of signals radiated by surrounding base transceiver stations at the mobile terminal. In the last case, the time differences of arrival are usually measured, either with respect to the signals from the serving transmitter (the 'serving cell') or with respect to the terminal's local clock.

Cellular communication systems for mobile users may be classified into those systems in which the base station transmissions are synchronised to a common time standard and those whose base-stations are unsynchronised. Communications systems using the CDMA protocol usually fall into the synchronised category whilst most of the others, including wide-band CDMA (WCDMA) and GSM which together comprise more than 80 percent of the world-wide installed network base, are not synchronised. The CDMA system is synchronised with GPS time using GPS receivers installed at base-station sites.

A mobile terminal's position may be estimated from measurements of the times of reception of the signals from surrounding base transceiver stations. In practice, what is usually measured is the time of reception of an identified component in the modulation, for example, the synchronisation burst which is broadcast on the control channel in GSM, or the phase of the spreading code in a CDMA systems, or a frame boundary in any system. These measurements need to be combined with the positions of the respective transmitters, and knowledge of the transmission times or transmission time offsets of the identified components. In general, independent timing measurements of the signals from several geographically-disparate base station transceivers are needed, the minimum number depending on the number of unknown variable that must be estimated in the calculation. In the case of a two-dimensional position calculation using synchronised transmitters, three measurements are sufficient. In the case of a two-dimensional position calculation using unsynchronised (but stable) transmitters, measurements by two separated terminals (or one which moves between the two positions) of the signals from five transmitters are needed (see U.S. Pat. No. 6,529,165 and U.S. Pat. No. 6,937,866).

CDMA network transmissions are synchronised with GPS, and the transmission time offsets of the individual transmitters are broadcast. Measurements of the time of receipt (relative to GPS time) by the terminal of the signals from the base transceiver stations on different sites can then be converted to ranges from the terminal to each of those sites and the horizontal position of the terminal can be calculated unambiguously. Similarly, the time differences between two received signals provides the range difference between the two base station transmitter sites, and three such range differences is sufficient to provide for the unambiguous computation of the terminal's location.

GSM and W-CDMA networks are unsynchronised, and for these measurements of time differences are often employed. Of particular interest are positioning methods which use measurements made by the mobile terminal of the nearby base transceiver stations. The times of receipt of a selected component in the modulation of the received signals are measured with respect to one of them or a local clock in the terminal. In the so-called Enhanced Observed Time Difference method (E-OTD), the relative transmission time offsets are deduced from similar measurements made by one or more fixed monitoring receivers (Location Measurement Units; LMUs) at known positions. By combining the relative timings made by the terminal with the corresponding relative timings made by an LMU, the position of the terminal may be calculated using either hyperbolic (U.S. Pat. No. 6,275,705) or circular (EP 1,271,178) techniques.

A development of E-OTD, described in U.S. Pat. No. 6,529,165 and U.S. Pat. No. 6,937,866 avoids the use of LMUs by combining the measurements of many base transceiver stations made by many mobile terminals in a grand computation (hence the code-name 'Matrix') from which emerges the positions of all the mobiles together with the transmission time offsets of all the base stations. Minimum configurations include two terminals each measuring five base stations or three terminals measuring four base stations, but in practice many terminals and many base stations are used. The transmission time offsets of the base stations may also be used to compute and maintain a 'Virtual' LMU (VLMU) which is a list of the receive time offsets which would be measured by a single real LMU at a given location able to receive the signals from all the base stations (see WO 00/73813).

Note that in both the E-OTD method and its Matrix development a universal time of transmission or reception of the base-station signals is never determined. Only relative time differences are measured. This means that it is not possible to extract, for example, the GPS time from the receipt of a network signal by the terminal without making a calibration, either using a GPS-referenced LMU to align the VLMU list with GPS time, or by calibrating in the mobile terminal (see WO 2005/071430).

Each of the positioning methods outlined above can be used alone as the sole means of providing the location of mobile terminal. However, it is an advantage to combine two or more methods together, so that one can provide a position when the other fails, and the network-based method can assist the SPS method to acquire satellite signals. Of particular interest here is a combination of the Matrix method and an SPS method, say GPS. The Matrix method can provide a position fix within a second so that a user has a result almost instantly. However, the accuracy in GSM is about 100 m which may not be sufficient for the purpose. The cellular signals can then also be used to provide accurate time and position assistance to the GPS receiver so that it can obtain a position fix after only a few seconds even in difficult environments (see for example *E-GPS: indoor mobile phone positioning on GSM and W-CDMA*, Duffett-Smith, P. J. & Tarlow, B. Proceedings of the ION GNSS 2005 meeting, Long Beach, September 2005). What is needed is a way of combining these two systems together to provide the best possible positioning service, and this is addressed in the present application.

DESCRIPTION OF THE PRIOR ART

There are several disclosures of methods which combine location calculation methods using SPS ranging signals and signals from unsynchronised cellular communication systems. Most use the SPS signals when these are available and not subject to blockage, or the network signals otherwise. The rationale for this selection is based on the expected accuracy. SPS signals can provide location accuracies within about 10 m when the signals paths from satellites to receiver are along lines of sight. The accuracy deteriorates to 50-100 m when the SPS signals are subject to blockage, and the method becomes unavailable altogether when signal are sufficiently attenuated. Even then there may remain 2 or 3 acceptable SPS signals. Network-based positioning methods can achieve approximately 100-200 m and are nearly always available as the cellular signals are so much stronger than the satellite signals.

U.S. Pat. No. 6,252,543 (Camp 2001) discloses a method of combining ranges derived from a GPS receiver with those from a terrestrial cellular communications system. Several options for combining the ranging measurements are disclosed. One of these uses two GPS ranging signals and two terrestrial communications signals whose times of flights have been measured and converted into range estimates. The method requires the synchronisation of clocks within at least two of the satellites and two of the cellular base stations. In the case when the clocks of the cellular base stations are not synchronised and when there are no GPS satellites present, a method is disclosed which requires the addition of a fifth base station ranging measurement to calibrate the clock in the mobile terminal with respect to a common time. No details are disclosed of how this is adapted to operate except in the case when the base stations are provided with a common clock, synchronised by using an LMU referenced to GPS time at each base station. The method is unsuitable for unsynchronised base stations such used in GSM or WCDMA systems.

U.S. Pat. No. 6,430,416 (Loomis 2002) discloses a method of assisting a GPS receiver in a mobile terminal using a low-cost radio system adapted especially for this purpose. The method has a mobile terminal containing both a GPS receiver and a wireless communication device. The wireless device includes a radio transmitter able to send a signal whose time of arrival at a base station can be determined. The signal also caries information concerning the mobile terminal including identification and GPS measurements when available. The timings of the transmissions are synchronised to GPS time when possible, otherwise the timings of the signals from the wireless device, as received at a number of base stations (at least three), are passed to a radio pseudo-range measurement device. If synchronisation with GPS is not possible an interrogation pulse can be transmitted from a device adapted for the purpose which is received by the base stations and any mobile terminals. The pseudo-range measurements are processed in a calculation centre associated with the base station equipment to determine the location of the mobile terminal. In some cases the pseudo-range measurements from both GPS and the radio range measurements can be mixed to form a location solution for the mobile terminal.

A further disclosure by Tsunehara and Kuwahara in U.S. Pat. No. 6,928,292 (2005) provides for a mobile terminal with both a GPS receiver and a cellular receiver adapted to provide position calculations from the cellular signals. Each of the location devices also provides a reliability indicator. The indicator may take one of several forms and is calculated from the received signals, either GPs or cellular. For GPS, the reliability indicator might be based on the number of satellite signals used in calculating the position and the received signal quality (such as signal-to-noise ratio). The cellular signals include synchronisation acquisition and reception timing measurements. The cellular signals are also used to determine the cellular signal reliability indicator including the number of signals used in the calculations and the received signal quality from each base station. The position calculation combines the separate position calculations from both GPS and cellular using the reliability indicators, for example by averaging. A restriction is that the two position measurements must be taken simultaneously.

Watters et al (U.S. Pat. No. 6,249,245, 2001) disclose an invention with four aspects. The first uses a cellular communication system to transmit differential GPS correction to a GPS receiver located with a mobile terminal able to receive the cellular signals. The second aspect provides for a GPS 'pseudolite' signal to be broadcast from the cellular base station when there are insufficient GPS satellites in view. The ranging measurement from the pseudolite is substituted for the GPS pseudo-range measurement. In the third aspect, the mobile terminal calculates its position using GPS signals when there are sufficient in view. When the requisite number of satellites are not in view, the location calculation is made with the cellular network infrastructure. In the fourth and final aspect of the invention, the cellular signals are used to compute a round-trip delay between base station and mobile terminal from which a distance calculation can be made. The distance calculation substitutes for GPS pseudo-ranges when insufficient GPS satellite signals are available.

None of the above method provides for the use of all the information available from the GPS and cellular signals and networks nor is the combination of the measurements from the two system types arranged in the optimum way. A better method is to use a combinatorial Kalman filter or similar process.

The use of Kalman filters for combining measurements from different navigation systems in order to obtain the best navigation solution is well known in the art. For example, in *Multi-configuration Kalman filter design for high-performance GPS navigation*, Kao, M. H & Eller, D. H. IEE trans. Auto control, AC28, 304-314, March 1983 it is disclosed how the measurements from a GPS receiver mounted on a vehicle can be combined with the measurements from inertial sensors also mounted on the vehicle. Another example is the combination of data from co-mounted separate SPS systems, such as GPS and GLONASS. There are many other examples. In these cases, however, the common goal is to combine together the outputs from different local systems measuring the same thing, in the example measurements of the vehicle's position, velocity and acceleration. As a by-product, the state of the GPS receiver's clock is also determined, and maintained as one of the variable in a state vector carrying all the components relevant to a complete description of the combined system.

The combining of different navigation systems through the use of a Kalman filter is also well-known in the art. For example, van Graas (J. Inst. Navigation 35, 2, 147-160, 1988) describes the fusion of GPS and Loran-C measurements using a technique that hybridizes pseudoranges to process efficiently all available navigation information. It is to be noted, however, that although the measurements come from two different systems, they are nevertheless both designed for navigation purposes. In particular, the clock offsets of the transmitters are known in each system. The same technique could not be applied to a system combining GPS with measurements made on unsynchronised cellular transmissions as the transmission time offset of each cellular transmitter is entirely unknown and arbitrary.

Of particular interest in the present case is the combining of satellite navigation system, such as GPS, with a positioning system based on the signals received from ground-based transmission sources, for example cellular network transmitters, such as that described in U.S. Pat. No. 6,529,165. Additional problems to be overcome include the provision of accurate time, position, and frequency aiding to the satellite positioning system for satellite acquisition and re-acquisition in weak signal conditions such as when a terminal is inside a building. In application number EP 06112194.3, a method of associating a universal time (such as GPS time) with a received signal (such as a cellular network signal) is described which allows a stable signal received from a transmitter controlled by a stable clock to be time-tagged in the mobile terminal. The universal time can then 'read' at a later time from another received signal. In WO 2005/071430, a method is described by which the time-tag can be carried as the mobile moves across a network from one transmitter to another, even though the transmitters themselves are unsynchronised with each other. Central to this is the VLMU concept described in WO 00/73813 by which a list of transmission time offsets of the transmitters is constructed and maintained, in effect as a by-product of the Matrix positioning method described in U.S. Pat. No. 6,529,165.

An additional problem associated with the use of signals from ground-based transmitters is that although their associated clocks are often quite stable, and usually much more so than the terminal's clock, they can drift gradually relative to each other, and relative to the particular universal time in use, so that a time-tag cannot be used indefinitely.

The present invention overcomes these problems by combining the measurements of the separate positioning systems in a manner which not only affords an excellent navigation solution at all times, but also tracks the states of all the clocks, both local and remote, in one process. The provision of accurate time, position, and frequency assistance to the satellite positioning system receiver is then 'built in', providing a smooth transition across all environments as the terminal moves around. This enables a navigation solution to be maintained with a smaller impact on the terminal's battery life, because fewer resources are required to maintain the terminal's track.

SUMMARY OF THE INVENTION

According to the invention there is disclosed a method, in a navigation system, of obtaining and maintaining a dynamic navigation solution for a mobile terminal which includes a transmission source receiver for receiving the signals from one or more unsynchronised terrestrial transmission sources, a satellite positioning receiver for receiving signals from the satellite or satellites of a satellite positioning system, and a terminal clock, the method comprising acquiring a measurement vector having a list of values, each value representing a measurement made by a receiver, and information related to the terminal's clock;

computing a state vector representing the current state of the system, using a previously-determined state vector, the measurement vector, and a dynamic model; and deriving a dynamic navigation solution from the state vector;

wherein the elements of the state vector include at least (a) in one or more dimensions position information of the terminal; (b) representations of the biases of the clocks associated with the unsynchronised terrestrial transmission sources relative to a given time; (c) the bias of the terminal clock; (d) quality indicators indicating the error associated with elements in (a) to (c); and (e) linking indicators indicating the dependency of elements in (a) to (c) on others of the elements.

The dynamic navigation solution comprises variables representing an estimate of the positional state of the terminal at a particular epoch, which variables include in one or more dimensions at least the position of the terminal, and may also include its velocity and acceleration. The particular epoch may be the current time, or it may be a time in the future or in the past. For example, in order to overcome a time delay of, say, 1 second between the computation of the navigation solution and displaying it on a screen, the particular epoch could be set to be one second in advance of the current time.

The invention also includes a navigation system including a mobile terminal which has a transmission source receiver for receiving the signals from one or more unsynchronised terrestrial transmission sources, a satellite positioning receiver for receiving signals from the satellite or satellites of a satellite positioning system, and a terminal clock, the system comprising a processor having means acquiring a measurement vector having a list of values, each value representing a measurement made by a receiver, and information related to the terminal's clock;

means computing a state vector representing the current state of the system, using a previously-determined state vector, the measurement vector, and a dynamic model; and means deriving a dynamic navigation solution from the state vector;

wherein the elements of the state vector include at least (a) in one or more dimensions position information of the terminal; (b) representations of the biases of the clocks associated with the unsynchronised terrestrial transmission sources relative to a given time; (c) the bias of the terminal clock; (d) quality indicators indicating the error associated with elements in (a) to (c); and (e) linking indicators indicating the dependency of elements in (a) to (c) on others of the elements.

The mobile terminal may be a terminal of a cellular communications network such as one using CDMA, GSM or W-CDMA technology. The terminal may or may not be registered on the network. Alternatively, the terminal may be any mobile device capable of receiving signals from one or more unsynchronised terrestrial transmission sources, and signals from one or more satellites of one or more satellite positioning systems. The invention includes terminals having more than one satellite positioning system receiver, or more than one unsynchronised terrestrial transmission source receiver, or both.

The unsynchronised terrestrial transmission sources may be the transmitters of one or more cellular communications networks, or they may be other transmission sources set up for any purpose. For example, the unsynchronised terrestrial transmission sources may be radio or television transmitters, or other broadcast transmitters. They may also be the transmitters of a synchronised, or partially-synchronised, system such as a cellular CDMA network, or the transmitters of a ground-based navigation system such as LORAN-C. In these cases, the method of the present invention would treat the transmissions as being unsynchronised, and would not require information to be available about the transmission time offsets of the transmitters, but would estimate them as part of the navigation solution. In all cases, there is a requirement that a time of reception can be assigned to an aspect of the signals received by the terminal from a transmission source. This might be the phase of the signals, or a modulation component or, in the case of a pulsed source, the reception of a particular pulse. There is usually a requirement that the aspect being used for this purpose either is continuous (such as the phase of the signal) or has a known repetition pattern (such as the synchronisation burst in a GSM broadcast control channel signal). The invention includes the use of signals from more than one type of unsynchronised terrestrial transmission source in the navigation solution. For example, signals from a GSM network and a W-CDMA network may both be measured and used together, or from a GSM network and a public broadcast radio or television network.

The satellite positioning system may include one or more of Transit, GPS, Galileo, Bidou or QZSS, or any other system which uses Earth-orbiting satellites for the purposes of locating terminals of the system. The invention include the use of signals from more than one satellite positioning system being used in the navigation solution.

The terminal clock may be any clock associated with, or connected to, the terminal. The clock, which may be implemented in hardware or software or both, is controlled by an oscillator which may be a part of a one of the unsynchronised terrestrial transmission source receivers, or a part of a one of the satellite positioning system receivers, or it may be a common component of all of the receivers, or it may be a separate oscillator. The terminal's local time is measured with respect to the state of the oscillator.

The processor may be associated with the terminal, or connected directly to the terminal, or it may be remote from it, receiving its data via one or more links. The link or links may be wired or wireless, depending on the application, and they may be uni-directional or bi-directional. For example, the processor may be the general purpose processor of a cellular terminal, or a remote processor connected to the terminal via a cellular wireless network.

The measurement vector includes a list of values, each value representing a measurement made by a receiver. For example, the values representing the signals from a satellite-system receiver may be estimates of the pseudo ranges or time offsets obtained from pre-processing in the receiver, measured either with respect to each other or to a common reference. In another example, the values represent estimates of the time offsets of reception of the signals from the unsynchronised terrestrial transmission sources, measured with respect to one of them, or to a common reference which may be the terminal clock, or another reference. The values could also be unprocessed 'raw' in-phase and quadrature (IQ) samples of a receiver's output. Many formats are possible, depending on the application.

The measurement vector also includes a value related to the terminal's clock. For example the phase of the oscillator may be represented, or the state of a counter connected to the oscillator, or the clock state may be represented indirectly, for example by clocking the measurement vector using the clock signals or a 'tick' derived from them or locked to them.

The measurement vector may be incomplete, or variable in length. This may occur, for example, during blockage of one or more satellites, or when the number of satellites and/or transmission sources changes. Components of the measurement vector which are temporarily unavailable, or have yet to be detected, may be represented by null entries in the measurement vector. Components which were present but have now disappeared, for example because the terminal has moved beyond the reception range of a transmission source, may at first be represented by null entries, and after a time may be removed altogether, thus shortening the measurement vector. The representation of the measurements in the measurement vector may also include one or more 'quality' parameters relating to a component. For example, a satellite pseudorange might be accompanied by a value representing the standard variance of the noise on the measurement, which may be set to the value −1 to represent a null measurement. Many other schemes are possible.

In the present application, a 'receiver' may or may not include means for processing the 'raw' signals before providing values for the measurement vector, such as cross-correlators, or software programs running on associated processors, where this is appropriate.

The computation to determine the state vector may be more or less complex depending on the nature and extent of the components in the measurement vector. For example, the computation might be of the kind used in Kalman filters or similar, when the measurement vector contains timing offsets or pseudo-ranges already obtained by the respective receivers from the received signals. If the measurement vector contains raw unprocessed data, the computation is more complex as it includes, in effect, the processing of those data to calculate time or range values. For example, U.S. Pat. No. 6,529,165 teaches how measurements by two or more terminals, at unknown locations, of relative times of reception of the signals from four or more transmission sources, whose positions are known or determined, can be used to find, simultaneously, the positions of the terminals and a list of the relative transmission time offsets. This calculation could be made as part of the computation of the state vector, starting from raw unprocessed data from the one or more transmission source receivers, or using already-determined time-offset values.

The state vector represents the current state of the system. The elements of the state vector include positioning information, information about the states of the clocks associated with the terminals and with the terrestrial transmission sources, quality indicators, and linking indicators.

The position information comprises information about the position of the terminal in at least one dimension, but may also comprise information in two or more dimensions, its velocity in one or more dimensions and its acceleration in one or more dimensions. For example, position information may be the actual position of the terminal expressed as longitude, latitude and height relative to a defined geoid, or it may be the position expressed in Cartesian coordinates with the origin at the centre of the Earth, or it may be a set of variables from which the actual position may be derived using a transformation.

The representations of the states of the clocks comprise at least their biases, that is their errors with respect to, or offsets from, a given time, but may also include their bias rates, rates of change of bias rates etc. The given time might be the time base of the satellite positioning system such as GPS time or other universal time, or it may be the time of one of the clocks. It should be noted that the elements relating to the clocks associated with the unsynchronised terrestrial transmission sources necessarily relate to clocks which are remote from the terminal which are not measured directly, whereas elements in the position information and in the representation of the state of the terminal clock relate to variables local to the mobile terminal. The elements representing the states of the clocks associated with the unsynchronised transmission sources may be indirect representations. For example, there may be unknown and possibly variable connections between the oscillator used to control a particular transmission source and the timings of the transmissions themselves from its antenna. It may only be the relative transmission time offsets of the unsynchronised transmission sources with respect to each other, or to a common reference, that can be determined. Therefore, these elements may be the offsets, offset rate of change etc. of the transmission times of the unsynchronised transmission sources, or the receive time offsets etc. appropriate to a VLMU position. For the purposes of integrated navigation, these elements of the state vector need only serve as a source of relative time, and hence a stable remote repository of time.

The quality indicators relate to the errors associated with the position information and with the clock-state representations, for example variance values. The linking indicators indicate the dependency of any of the elements of position information or clock-state representations on any others of the elements and may, for example, be co-variance values.

The computation to determine the values of the elements in a state vector is carried out by the processor and includes the use of some or all of the values of the elements of one or more previous state vectors as well as the list of values comprising the latest measurement vector. The computation includes the use of one or more dynamic models describing how variables may change from one computation to the next, such as a dynamic model of terminal motion which may restrict possible solutions to those that are physically likely. For example, a pedestrian of mass 80 kg would be most unlikely to accelerate from walking speed to 30 m s$^{-1}$ in one second (unless struck by a car). Nevertheless, unconstrained data might suggest such a navigation solution because of errors. The dynamical model places realistic constraints and therefore the erroneous measurements are given reduced weights in the solution. Only when subsequent measurements provide additional support for the unlikely motion will the weights be increased in line with the likelihood of the fit to the data. Other dynamic models may restrict how fast estimates of the states of the network and local clocks are allowed to change.

BRIEF DESCRIPTION OF THE DRAWINGS

The invention and examples of the system in which it may be deployed will now be further described with reference to the accompanying drawings, in which:—

FIG. 3 is a table showing components of a measurement vector;

FIG. 4 is a table showing the components of a state vector;

FIG. 5 shows the components of a covariance matrix;

FIG. 6 is a table of the components of a dynamic navigation solution; and

DETAILED DESCRIPTION OF THE EXAMPLES

Figure 1:
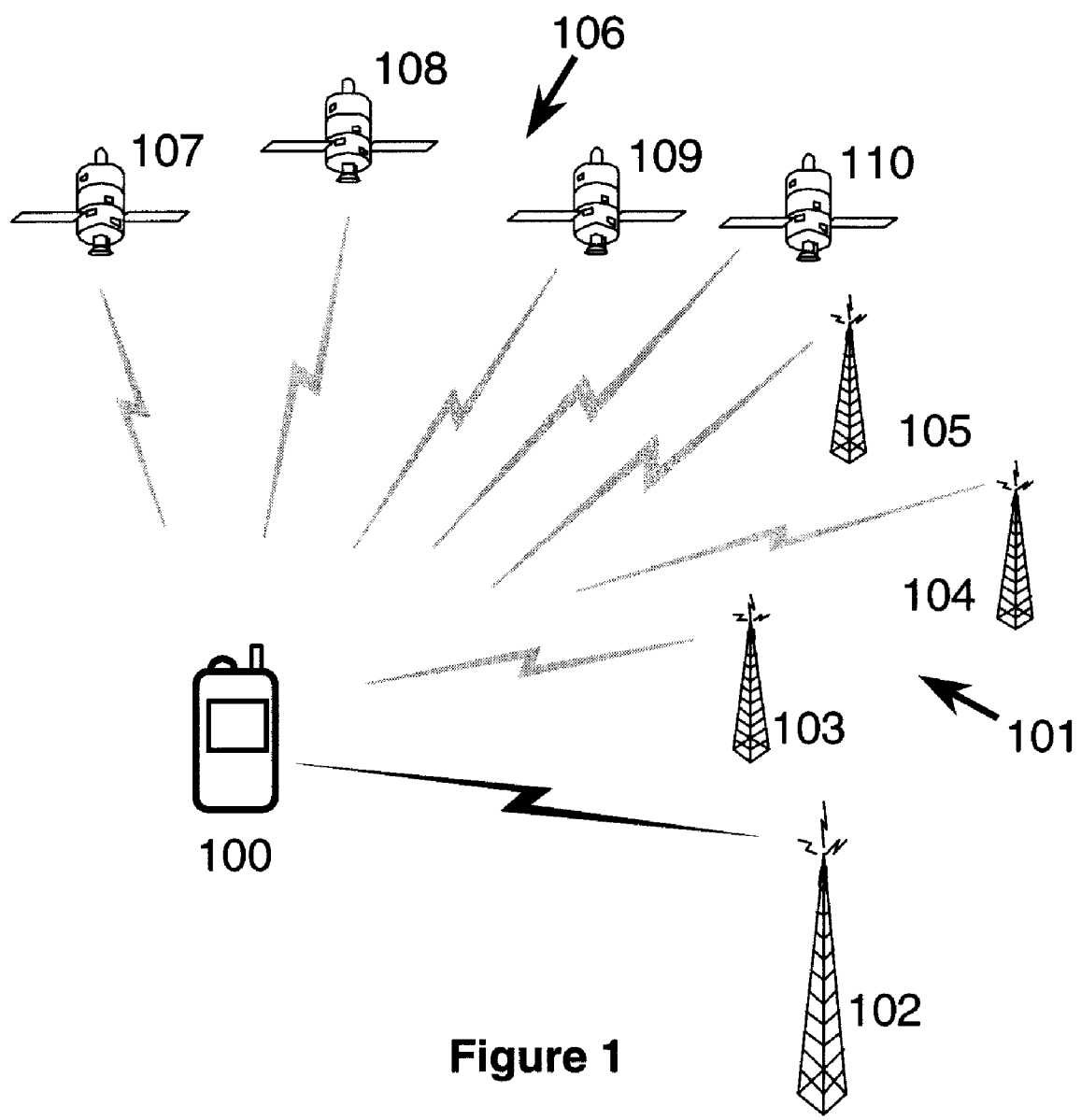
FIG. 1 illustrates a system having a terminal of a communications network, base transceiver stations, and GPS satellites.

FIG. 1 shows a mobile terminal 100 which is able to receive signals from a cellular mobile communications network 101 having base transceiver stations 102-105, and signals from a satellite positioning system 106 having satellites 107-110. In this particular instance, the cellular network is a GSM network in which the base transceiver stations are unsynchronised with each other, but the invention applies equally to transmission sources of any type, whether they are a part of a cellular communications network or not. Again, in this particular instance the satellite positioning system 106 is the Global Positioning System, and the satellites are space vehicles (SVs) of that system in low Earth orbit, but the invention applies equally to any satellite positioning system having one or more space vehicles.

Figure 2:
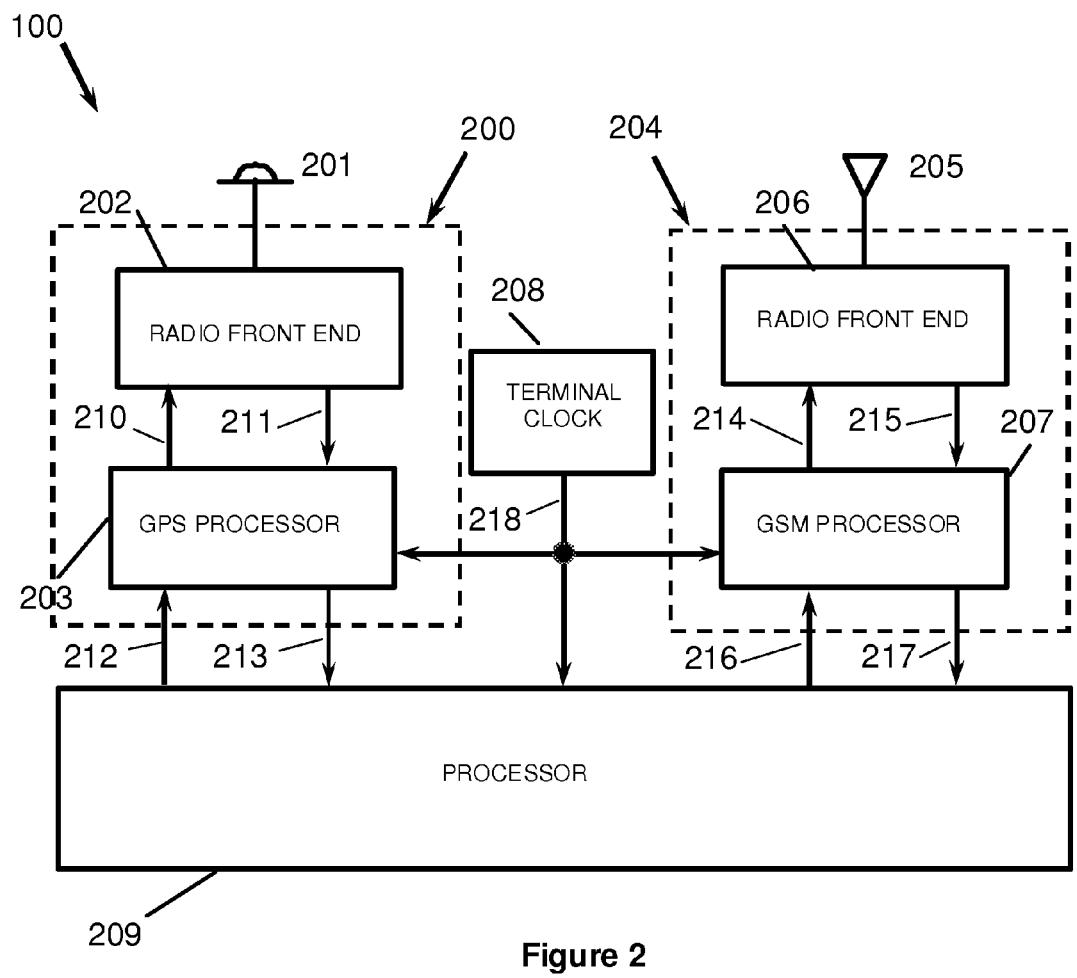
FIG. 2 shows the principle components of a mobile terminal relevant to the invention.

FIG. 2 is a schematic diagram of the principal components of a mobile terminal 100 adapted to the present invention. A GPS receiver 200 consists of an antenna 201 for picking up the signals from GPS satellites 107-110 which are passed to a radio front-end 202. This carries out the amplification, frequency-changing, band-pass filtering, and digitising functions usually associated with a GPS receiver and outputs In-phase and Quadrature-phase (IQ) digital samples at 211. In the current implementation, these are passed to GPS processing module 203 where functions such as cross-correlations and demodulations are carried out. In another implementation, the IQ samples are passed directly to processor 209, by-passing GPS processing module 203 (which may therefore be absent altogether). Module 203 makes estimates of the time offsets of the code phases in the signals from the various satellites 107-110, or equivalently estimates of the pseudo ranges. These are passed to the processor 209 via link 213.

A GSM receiver 204 consists of an antenna 205 for picking up the signals from GSM transmitters 102-105 which are passed to a radio front-end 206. This carries out the amplification, frequency-changing, band-pass filtering, and digitising functions usually associated with a GSM receiver and outputs IQ digital samples at 215. In the current implementation, these are passed to GSM processing module 207 where functions such as cross-correlations and demodulations are carried out. In another implementation, the IQ samples are passed directly to processor 209, by-passing the GSM processing module 207 (which may therefore be absent altogether). Module 207 extracts estimates of the time offsets of the identified components in the signals from the various GSM transmitters 102-105. These are passed to the processor 209 via link 217.

Also shown in FIG. 2 is terminal clock module 208, consisting of an oscillator and other components which together produce a regular clock signal at 218. This is applied to processing module 203 of the GPS receiver 200 and from there to the GPS front-end 202 via link 210. The clock signal is also applied to processing module 207 of the GSM receiver 204 and from there to the GSM front-end 206 via link 214. The clock signal is also passed directly to the processor 209. In the cases of receivers 200 and 204, each uses the clock signal as its reference source. In the case of processor 209, the clock signal is used to trigger a series of interrupts by which a software program running on the processor keeps track of the local time. In another implementation, the clock signals are accepted directly as 'local clock samples'.

Other links are shown in FIG. 2 at 212 and 216. These provide for control information to be passed from processor 209 to the respective receiver 200, 204. For example, the control information supplied to the GPS receiver 200 is in the form of software messages including estimates of the GPS time and the frequency offset. These form part of the assistance provided to the GPS receiver. Other assistance such as satellite ephemeris and almanac may be supplied from a server attached to GSM network 101 and sent via broadcast or point-to-point messaging to mobile terminal 100. These message are picked up via antenna 205, processed and supplied to the GPS receiver 200 via links 215, 217 and 212. Similarly, VLMU values (used as starting values in the present case) can be sent from a server in the network to the processor 209 via the wireless interface and links 215, 217.

A measurement vector, illustrated in FIG. 3, is constructed from the estimates of the GPS code phase offsets passed from module 203, the receive time offsets from module 207, and indirectly from the clock signal from local clock 208. In the particular case shown, there are $N_s=5$ components $s_1$ to $s_5$ corresponding to the relative timings of the code phases from satellites SV1 to SV5, together with a quality indicator $\sigma_{s1}^2$ to $\sigma_{s5}^2$ applying to each one. The quality indicator takes the form of a variance value for which zero represents perfect noiseless data. As the value of the corresponding component becomes less reliable, the variance increases. A special 'flag' value of minus one indicates that the corresponding component is not present and indicates a null value. Such null values are ignored in the computation.

The $N_n=6$ observed time differences $n_1$ to $n_6$ of the signals received by the mobile terminal from six GSM base transceiver stations are also components of the measurement vector shown in FIG. 3, together with their quality indicators $\sigma_{n1}^2$ to $\sigma_{n6}^2$. Again these may take the form of values of the variance in the corresponding components, but in another implementation they may be derived from other information, for example how well the cross-correlation profile of the signals from the respective transmitter fits the expect profile. Null data values may also be represented by corresponding quality indicator values of minus one.

The local clock time $t_L$ shown in FIG. 3 is a value read from a software counter. The signal from local clock oscillator 208 is applied to an interrupt terminal on processor 208 which is programmed to increment the counter every time an interrupt is generated. Hence there is no quality indicator assigned to this value. It is always present (there is a fatal error if not) and its value—a definite digital value—is taken to be the local time at the instant of the next interrupt following.

FIG. 4 shows in tabular form the state vector used in this example of the invention. The mobile terminal's three-dimensional position information is represented in the form of its position in longitude, latitude and height (x, y, z relative to the WGS84 geoid), its velocity ($v_x$, $v_y$, $v_z$, and its acceleration ($a_x$, $a_y$, $a_z$). These are the values calculated at the epoch of the state vector, which is taken to be the current instant, i.e. the instant specified on the terminal clock in the measurement vector. Also carried in the state vector is an estimate of the terminal clock bias $T_L$ and rate of change thereof $T_L'$. If the terminal clock time in the measurement vector is $t_L$, then the best estimate of the GPS time at the current instant is $\tau = t_L + T_L$.

Also shown in FIG. 4 are values of the transmission time offsets $\alpha_A$ to $\alpha_N$ and the corresponding rates of change $\alpha_A'$ to $\alpha_N'$. The value of N is the total number of transmission sources represented in the state vector, but this is not necessarily the same as $N_n$, the number represented in a measurement vector, as $N_n$ fluctuates with the movement of the mobile terminal, and the subset of transmission sources able to be received by the terminal also changes.

Another element of the state vector displayed in FIG. 4 is a covariance matrix C. This is shown in more detail in FIG. 5. It is a matrix of p×p elements, where p is the total number of variables represented in the state vector not including C itself. In the present case, with entries for 30 satellites and, say, 30 transmission sources, the matrix has 131×131=17161 elements in principle, though many of these will be zero. The quantities along the diagonal of the matrix are the variances associated with the corresponding element of the state vector. In this case, for example, the element at position (3,3) is the variance $\sigma_{zz}^2$ associated with the estimate of z. The off-diagonal terms indicate how much coupling exists between the corresponding variables in the state vector, and many will therefore have values of zero representing no coupling. For example, $\sigma_{a_K x}^2$ represents the degree of coupling that exists between the transmission time offset of transmission source K and x. In the particular case described here, there is just one covariance matrix. In another implementation, the single covariance matrix is divided into several smaller covariance matrices.

The navigation solution (FIG. 6) is derived from the state vector. This includes the position of the mobile terminal in three dimensions (x, y, z) together with velocity ($v_x$, $v_y$, $v_z$) and acceleration ($a_x$, $a_y$, $a_z$) and the GPS time $\tau$. Since these values are all represented explicitly in the state vector in this case, the process of determining the current navigation solution can be simply one of selecting the corresponding variables from the state vector. If, however, a navigation solution is required for a future time, say GPS time $\tau + t$, an extrapolation must first be made. If t is small enough that the acceleration can be taken to be constant, then the extrapolated position r can be found using the current position $r_0$, velocity v and acceleration a using the equation $$r = r_0 + vt + \frac{1}{2}at^2, \quad (1)$$

where the bold face indicates a vector quantity. In another implementation, the position information in the state vector is carried in a different form, for example in a different coordinate system, or as a set of distances from known points. The calculation of the current navigation solution must then include a transformation.

The calculation to find a new state vector includes the steps of (i) processing the measurements from the terrestrial transmission source receiver to obtain estimates of the current position of the mobile terminal and the transmission time offsets of the transmission sources, (ii) processing the measurements from the GPS receiver to obtain ranges to the detected satellites from the current estimate of the mobile terminal's position at the current estimated GPS time, and (iii) combining the results using at least one previous state vector, a dynamic model of the terminal's motion, dynamic models of the transmission source clocks and a dynamic model of the terminal clock to obtain the new state vector. The operation of the GPS receiver is also aided by the information held in the previous state vector, especially the estimates of the GPS time, the mobile terminal's position, and the rate of change of the terminal clock bias (i.e. its frequency offset). This allows the GPS receiver to be used intermittently and to be turned off between measurements, thus enhancing battery life. In a conventional mode of operation, the GPS receiver needs to track the satellites in view which requires making measurements every second or so. By using the measurements of the signals from the terrestrial transmission source, the local clock drift, motion of the mobile terminal, and errors in the terminal clock, may all be tracked independently of GPS requiring only occasional fixes from the GPS system.

The Matrix method disclosed in U.S. Pat. No. 6,529,165 and U.S. Pat. No. 6,937,866 uses measurements of the relative receive times of signals from multiple transmission sources at multiple terminal positions to compute all the terminal positions and the transmission time offsets of the transmission sources. The way in which the method operates can be illustrated by considering the equations governing it. For simplicity, the analysis is restricted to the two-dimensional case, i.e. the terminal positions and base stations all lie in a plane. This is the usual configuration, although in the centre of a high-rise city three-dimensional geometry might be more appropriate. The $i^{th}$ terminal position in a set of M such positions is specified by the vector $r_i$ relative to an arbitrary origin in the plane, and the position of the $j^{th}$ network transmitter in a set of N transmitters by the vector $b_j$ relative to the same origin. The time, $t_{ij}$ at which a signal is received at terminal position i from transmitter j is then given by the equation $$ct_{ij} = |r_i - b_j| + \epsilon_i + \alpha_j, \quad (2)$$

where i=1 ... M, j=1 ... N, $\epsilon_i$ is the time offset at that position of the terminal's local clock (expressed as a distance), $\alpha_j$ is the transmission time offset of the transmitter (also expressed as a distance), and c is the radio wave propagation speed. The values of t, $\epsilon$ and $\alpha$ are all expressed relative to a universal uniform clock.

This defines a set of MN equations in 3M+N−1 unknowns. (The −1 term arises because the absolute values of the timings have no meaning, so that one of the $\epsilon_i$ or $\alpha_j$ values can be set to zero without loss of generality.) Provided that MN is at least as large as 3M+N−1, a solution to the set can exist, and if the geometrical disposition of the base stations and terminal positions allows it, the calculation yields all the values of $r_i$, $\epsilon_i$, and $\alpha_j$, maintaining the network timing model with the values of $\alpha_j$, and discarding the other values. The positions of the base stations are assumed to be known, and must be supplied to the processor in the terminal, for example from a server in the network and broadcast.

The position of a mobile terminal can be calculated from its measurements of just three or more terrestrial transmission sources provided that the corresponding values of $\alpha_j$ can be obtained from the network timing model. Minimum configurations for generation of the network timing model include (M=2, N=5) and (M=3, N=4), but in practice the timing measurements from many terminals are used.

In the present case, a single terminal is used which moves from position to position. This requires that the transmission sources are sufficiently well-controlled that their transmission time offsets can be predicted over long-enough periods. In practice, it is found that many networks display stabilities ranging from 1 hour to one day, depending on the network configuration and design.

The equations and methods used in the computation of the terminal's position from the GPS range measurements are very well known, and are not reproduced here. However, there are fundamental differences between these and the Matrix computation discussed above as follows:

(a) The satellite clock biases are broadcast so that the GPS receiver can treat the SVs as synchronised transmission sources. A calculation based on four or more ranges therefore yields GPS time as well as the terminal's position.

(b) As noted above, the Matrix method uses only the differences between receive time offsets, and the transmission sources are unsynchronised, so that there is no equivalent concept of 'network time'. The reference time of the list of transmission time offsets is arbitrary, but can be set to GPS time by calibration (WO 2005/071430).

The interaction between the two methods, GPS and Matrix, is therefore mostly through the time offset discussed in (b). The estimate of the GPS time in the state vector is carried forward by the relatively-stable remote terrestrial transmission source clocks from one computation to the next in a fashion which allows for the movement of the terminal.

A dynamical model of the mobile terminal's motion suitable for use in pedestrian navigation is one which limits the maximum acceleration allowed. This can be expressed simply by limiting the value of $$a = \frac{2|r_{k+1} - r_k|}{t^2}, \quad (3)$$

where $r_k$ is the $k^{th}$ vector position of the terminal and $r_{k+1}$ its vector position at a time t later, and the vertical bars denote the modulus of the contained vector quantity. In the computation of the state vector, the solution is constrained by the need to keep the value of a within a range of probable values.

Dynamical models of the transmission source clocks and the terminal clock can be similarly constrained within a bound of possible 'accelerations' (second rates of change of clock biases).

The computation to calculate the next state vector given the current state vector and a measurement vector can be carried out using a number of techniques known in the art. For example, the equations governing Matrix and GPS can be linearised by expansion about the position of the terminal and GPS time inferred from the current state vector using Taylor expansions, and then may be used to govern a linear Kalman filter. Other techniques, such as non-linear Kalman filter methods, are possible which do not require linearisation of the equations. However, they tend to be much less well-behaved in noisy conditions, or when the measurements are ill-conditioned, for example when the satellite and/or terrestrial transmission source geometry is poor.

A preferred method of calculating the next state vector is now described which uses a recursive least-squares discrete time filter and propagator. This process may be adaptive or non-adaptive, and it moves from one discrete time instant to the next in such a way as to minimise the errors in the estimate of the state vector. We label the discrete time instances 1, 2, 3 ... k−1, k, k+1, ... using the subscript k to indicate the $k^{th}$ such instant in the series. It should be noted that the variable names used below have the meanings given below, and should not be confused with variable names used above.

Figure 7:
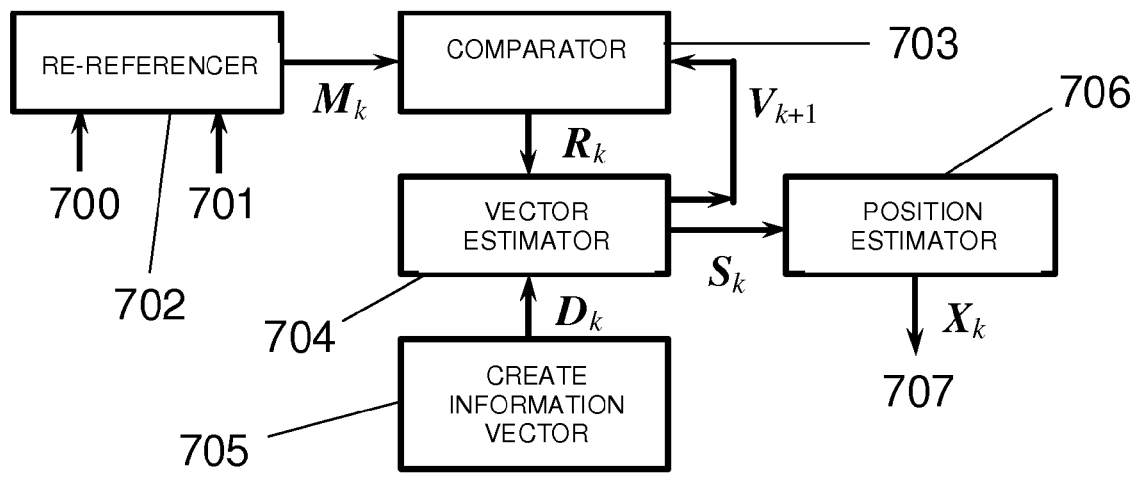
FIG. 7 is block diagram of a computation.

A block diagram of the process is shown in FIG. 7. A measurement vector at 700 is re-referenced in 702 to be in terms of measurements of the times of arrival of signals with respect to the local clock 208. The signals, if present in the measurement vector, may come both from the GPS receiver 200 and from the terrestrial transmission source receiver 204. Additional information identifying each component is provided on data channel 701. The re-referenced measurement vector $M_k$ in 702 is representative of the measurements made at discrete time instant k.

The value of vector M predicted at the previous time step (that is at the previous discrete time instant k−1) for instant k is represented by the symbol $V_k$ and is compared with $M_k$ in 703 to form a residual vector $R_k$, i.e.

$$R_k = M_k - V_k. \quad (4)$$

The state vector $S_k$ for discrete time instant k is calculated in 704. Inputs to this calculation include $R_k$, the previous state vector $S_{k-1}$, and an information vector $D_k$ which includes an initial position information vector $X_0$, the terrestrial transmission source locations, information defining the current predicted satellite positions at instant k, and a clock model for each satellite comprising the three clock correction parameters which relate the clock offset from each satellite to GPS time. The vector $V_{k+1}$ of the predicted value of $M_{k+1}$ is also calculated ready for the next time instant.

The process of estimating the state vector in 704 may be described in mathematical terms as follows. Here and elsewhere, a vector is represented by a bold, italicised symbol such as S, X etc., and a bold upright symbol represents a matrix, for example H, Θ etc.

It is assumed that there is a linear relationship between re-referenced measurement vector M and the corresponding state vector S according to $$M_k = H_k \cdot S_k + n_k, \quad (5)$$

where $n_k$ represents the measurement errors, $H_k$ is a matrix, and the dot symbol · represents matrix multiplication. A prediction of the next state vector $S_{k+1}$ is formed from the previous state vector $S_k$ by propagating the state vector to the next discrete time instant according to $$S_{k+1} = \Theta_{k+1,k} \cdot S_k + w_k \quad (6)$$

where $\Theta_{k+1,k}$ is the state-vector propagation matrix embodying the dynamic model of the system from k to k+1, and $w_k$ is a noise sequence representing the estimation errors. In equations (5) and (6), the sequences $(n_k) = (n_1, n_2, \ldots)$ and $\{w_k\} = (w_1, w_2, \ldots)$ represent independent white noise sequences, with zero means and covariance matrices described by $$\langle n_k n_j^T \rangle = N_k \times \delta_{kj}, \text{ and}$$

$$\langle w_k w_j^T \rangle = W_k \times \delta_{kj} \quad (7)$$

where the angle braces indicate that the expectation value of the enclosed quantity is to be taken, $N_k$ is the variance of $n_k$, $W_k$ is the variance of $w_k$, $\delta_{kj}$ is the Kroeneker delta ($\delta_{kj} = 0$ for j≠k, and $\delta_{kj} = 1$ for j=k), and the superscript T indicates the transpose. The two white noise sequences are independent, so $\langle N_k W_j^T \rangle = 0$ for all k and j.

An estimate, $\hat{S}_{k|k}$, of the state vector $S_k$ is computed from the re-referenced measurement sequence $(M_0, M_1, \ldots, M_k)$ so as to minimise the mean square error on the estimate. The subscript notation k|k is to be read as 'at the time instant k, given the entire measurement sequence up to and including that taken at time instant k'. The estimate that accomplishes this is calculated, by means of a Markov model, as an explicit function only of the measurement $M_k$ and the previous best estimate of the state vector $\hat{S}_{k-1|k-1}$, that is made at time k−1 using data accumulated up to and including that received at time instant k−1, and is a linear combination of (a) the estimate predicted in the absence of new data, which is $\hat{S}_{k|k-1} = \Theta_{k,k-1} \cdot \hat{S}_{k-1|k-1}$, and (b) the measurement residual $R_k$. The new state vector, $S_k$, is calculated in 704 by propagating the best estimate of the state vector made at time k−1 forward to the next time instant, k, using the transition matrix, $\Theta_{k,k-1}$, according to $$\hat{S}_{k|k} = \Theta_{k,k-1} \cdot \hat{S}_{k-1|k-1} + G_k \cdot R_k \qquad (8)$$
$$= \Theta_{k,k-1} \cdot \hat{S}_{k-1|k-1} + G_k \cdot [M_k - H_k \cdot \hat{S}_{k|k-1}]$$
$$= \Theta_{k,k-1} \cdot \hat{S}_{k-1|k-1} + G_k \cdot [M_k - H_k \cdot \Theta_{k,k-1} \cdot \hat{S}_{k-1|k-1}]$$

Consequently, the best estimate of the current state vector is made using the previous best estimate of the state vector and the measurement data accumulated in the intervening interval, that is between k and k−1. The gain matrix, $G_k$, is chosen to minimise $\langle (S_k - \hat{S}_{k|k})^T (S_k - \hat{S}_{k|k}) \rangle$ and is given by $$G_k = P_{k|k-1} \cdot H_k^T (H_k \cdot P_{k|k-1} \cdot H_k^T + N_k)^{-1}, \qquad (9)$$

where $N_k$ is the matrix of $N_k$, and the matrix $P_{k|k-1}$ is the covariance of the error in the predicted estimate given by $$P_{k|k-1} = \langle (S_k - \hat{S}_{k|k-1})(S_k - \hat{S}_{k|k-1})^T \rangle \qquad (10)$$
$$= \Theta_{k,k-1} \cdot P_{k-1|k-1} \cdot \Theta_{k,k-1}^T + W_{k-1}$$

where $W_{k-1}$ is the Matrix of $W_{k-1}$. The matrix $P_{k|k}$ is the covariance of the error in the estimate, $\hat{S}_{k|k}$, and is given by $$P_{k|k} = \langle (S_k - \hat{S}_{k|k})(S_k - \hat{S}_{k|k})^T \rangle \qquad (11)$$
$$= P_{k|k-1} - G_k \cdot H_k \cdot P_{k|k-1}$$

The final step in the process, 706, forms the estimate of the current position information vector $X_k$ from the state vector $S_k$ as discussed above. This is output as the dynamic navigation solution at 707.

The invention claimed is:

1. A method, in a navigation system, of obtaining and maintaining a dynamic navigation solution for a mobile terminal of a cellular communications network which mobile terminal includes a transmission source receiver for receiving the signals from one or more unsynchronised terrestrial transmission sources of the cellular communications network, a satellite positioning receiver for receiving signals from the satellite or satellites of a satellite positioning system, and a terminal clock, the method comprising acquiring a measurement vector having a list of values, each value representing a measurement made by a receiver, and information related to the terminal's clock;

computing a state vector representing the current state of the navigation system, using a previously-determined state vector, the measurement vector, and a dynamic model; and deriving a dynamic navigation solution from the state vector;

wherein the elements of the state vector include at least (a) in one or more dimensions position information of the terminal; (b) representations of the biases of clocks associated with the unsynchronised terrestrial transmission sources relative to a given time; (c) the bias of the terminal clock; (d) quality indicators indicating an error associated with elements in (a) to (c); and (e) linking indicators indicating the dependency of elements in (a) to (c) on others of the elements.

2. A method according to claim 1, wherein the elements (a) of the state vector also include velocity information.

3. A method according to claim 1, wherein the elements (a) of the state vector also include acceleration information.

4. A method according to claim 1, wherein the elements (b) of the state vector include the bias rates of the clocks.

5. A method according to claim 1, wherein the elements (b) of the state vector include the rates of change of the bias rates of the clocks.

6. A method according to claim 1, wherein the elements (c) of the state vector include the bias rate of the terminal clock.

7. A method according to claim 1, wherein the elements (c) of the state vector include the rate of change of the bias rate of the terminal clock.

8. A method according to claim 1, wherein the quality indicators (d) of the state vector include variance values of the elements in (a) to (c) of the state vector.

9. A method according to claim 1, wherein the linking indicators (e) of the state vector include co-variance values relating elements in (a) to (c) with others of the elements in (a) to (c).

10. A method according to claim 1, wherein the dynamic navigation solution comprises variables representing an estimate of the positional state of the terminal at a particular epoch, which variables include at least the position of the terminal.

11. A method according to claim 10, wherein the variables representing an estimate of the positional state of the terminal at a particular epoch also include its velocity.

12. A method according to claim 10, wherein the variables representing an estimate of the positional state of the terminal at a particular epoch also include its acceleration.

13. A method according to claim 1, wherein the list of values of the measurement vector includes estimates of the pseudo ranges or time offsets obtained from pre-processing in the receiver, measured either with respect to each other or to a common reference.

14. A method according to claim 1, wherein the list of values of the measurement vector includes estimates of the time offsets of reception of the signals from the unsynchronised terrestrial transmission sources, measured with respect to one of them, or to a common reference.

15. A method according to claim 1, wherein the value of the measurement vector related to the terminal's clock state represents the phase of an oscillator, or the state of a counter connected to the oscillator.

16. A method according to claim 1, wherein the value of the measurement vector related to the terminal's clock state is represented indirectly by clocking the measurement vector using the clock signals or a 'tick' derived from them or locked to them.

17. A method according to claim 1, wherein components of the measurement vector which are temporarily unavailable, or have yet to be detected, are represented by null entries in the measurement vector.

18. A method according to claim 1, wherein the representation of the measurements in the measurement vector also include one or more quality parameters relating to a component.

19. A method according to claim 1 in which measurements are made of the signals from more than one satellite positioning system.

20. A method according to claim 1 in which measurements are made of the signals from unsynchronised terrestrial transmission sources of more than one type.

21. A navigation system including a mobile terminal which has a transmission source receiver for receiving the signals from one or more unsynchronised terrestrial transmission sources of a cellular communications network, a satellite positioning receiver for receiving signals from the satellite or satellites of a satellite positioning system, and a terminal clock, the system comprising a processor having
- means acquiring a measurement vector having a list of values, each value representing a measurement made by a receiver, and information related to the terminal's clock;
- means computing a state vector representing the current state of the system, using a previously-determined state vector, the measurement vector, and a dynamic model; and
- means deriving a dynamic navigation solution from the state vector;

wherein
the elements of the state vector include at least (a) in one or more dimensions position information of the terminal; (b) representations of the biases of clocks associated with the unsynchronised terrestrial transmission sources relative to a given time; (c) the bias of the terminal clock; (d) quality indicators indicating an error associated with elements in (a) to (c); and (e) linking indicators indicating the dependency of elements in (a) to (c) on others of the elements.

22. A system according to claim 21, wherein the mobile terminal is a terminal of a cellular communications network.

23. A system according to claim 21, wherein the terminal has more than one satellite positioning system receiver and/or more than one unsynchronised terrestrial transmission source receiver.

24. A system according to claim 21, wherein the unsynchronised terrestrial transmission sources are the transmitters of one or more cellular communications networks.

25. A system according to claim 21, wherein the satellite positioning system includes one or more of Transit, GPS, Galileo, Bidou or QZSS.

26. A system according to claim 21, wherein the terminal clock is controlled by an oscillator which is part of one of the unsynchronised terrestrial transmission source receivers and/or part of one of the satellite positioning system receivers.

27. A system according to claim 21, wherein the processor is associated with the terminal, or connected directly to the terminal.

28. A system according to claim 21, wherein the processor is remote from the terminal.

* * * * *